3,012,941
Δ⁴-9α-HALOGENO - 3β,11β,17β - TRIHYDROXY-11α-
METHYL-ANDROSTENES AND ESTERS THERE-
OF
Albert Wettstein, Georg Anner, and Ludwig Ehmann,
Basel, Switzerland, assignors to Ciba Pharmaceutical
Products Inc., Summit, N.J.
No Drawing. Filed June 23, 1959, Ser. No. 822,176
Claims priority, application Switzerland June 25, 1958
13 Claims. (Cl. 167—74)

The present invention provides new, highly androgenic halogeno-androstenes of the formula

[structure: steroid nucleus with HO— at position 3, HO— and —CH₃ at position 11, OH at position 17, and X substituent]

in which X stands for a chlorine or fluorine atom, and their esters, especially their 3-esters, and their 3,17-diesters.

The products of the present invention are obtained when a compound of the formula

[structure: steroid with O= at position 3, HO— and —CH₃ at position 11, OH at position 17, and X substituent]

in which X stands for a chlorine or fluorine atom, is reduced with a complex light-metal hydride, and the resulting compound, if desired, is converted into a 3-ester thereof.

To carry out the reduction according to the present invention the starting material is treated with a complex light-metal hydride such, for example, as lithium aluminum hydride, lithium boron hydride, sodium or potassium boron hydride in the presence of a suitable solvent such as ether, dioxane, tetrahydrofuran, an alcohol or an acetic acid ester. The Δ⁴-3-hydroxy compounds are isolated in known manner, for example by crystallization and/or chromatography. In contradistinction to the starting materials the products of the invention give a characteristic red coloration with concentrated sulfuric acid.

The Δ⁴ - 17α - methyl - 9α - halogeno - androstene-3:11:17-triols thus obtained can be esterified in the 3-position by known methods. The acid residues of these esters are those of saturated or unsaturated aliphatic, cycloaliphatic, aromatic or heterocyclic carboxylic acids, preferably of lower aliphatic, monocyclic cycloaliphatic, aromatic or heterocyclic carboxylic acids, lower monocyclic araliphatic or cycloaliphatic carboxylic acids, such as, for example, of formic, acetic, propionic acid, of the butyric acids, valeric acids, such as n-valeric acid or trimethylacetic acid, of the caproic acid such as β-trimethylpropionic acid or diethylacetic acid, of oenanthic, caprylic, pelargonic, capric, undecylic acids, for example of undecylenic acid, of the lauric, myristic, palmitic or stearic acids, for example of oleic acid, cyclopropyl-, cyclobutyl-, cyclopentyl- and cyclohexylcarboxylic acids, cyclopropylmethylcarboxylic acid, cyclobutylmethyl-carboxylic acid, cyclopentylethylcarboxylic acid, cyclohexylethylcarboxylic acid, of the cyclopentyl-, cyclohexyl-, or phenyl-acetic acids or -propionic acids, of benzoic acid, phenoxyalkane acids such as phenoxyacetic acid, para-chlorophenoxy-acetic acid, 2:4-dichlorophenoxyacetic acid, 4-tertiary butylphenoxyacetic acid, 3-phenoxypropionic acid, 4-phenoxy-butyric acid, of furan-2-carboxylic acid, 5-tertiary butylfuran-2-carboxylic acid, 5-bromofuran-2-carboxylic acid, of nicotinic acid, of β-ketocarboxylic acids, for example of acetoacetic, propionylacetic, butyrylacetic or caprionylacetic acid, of amino acids such as diethylaminoacetic acid, aspartic acid and the like. Instead of residues of carboxylic acids there may be present those of sulfonic acids, phosphoric, sulfuric or hydrohalic acids.

Special importance attaches to esters that contain a group imparting solubility in water, such as a hydroxyl, carboxyl or amino group, since they may be used for the preparation of aqueous solutions. The semiesters obtained in this manner are derived from dicarboxylic acids, for example from oxalic, succinic, maleic, glutaric, dimethylglutaric, pimelic, acetonedicarboxylic, acetylenedicarboxylic, phthalic, tetrahydrophthalic, hexahydrophthalic, endomethylene - tetrahydrophthalic, endomethylene-hexahydrophthalic, endoxy-hexahydrophthalic, endoxytetrahydrophthalic, camphoric, cyclopropanedicarboxylic, cyclobutane-dicarboxylic, diglycolic, ethylenebisglycolic, polyethylene-bisglycolic, thioglycolic, furan-dihydrofuran-, tetrahydro-furan-dicarboxylic acids, quinolinic, cinchomeronic acid, as well as from the polyethylene-glycol monoalkyl ether semiesters of the afore-mentioned dicarboxylic-acids, or from polybasic inorganic acids, such as sulfuric acid, phosphoric acids and the like.

In the so-obtained semiesters the free acid group of the dicarboxylic acids used or of the polybasic inorganic acids can also be further esterified. Thus, for example, by reaction with diazomethane in methanol-ether the methyl esters of the 3-hemidiglycolates, 3-hemisuccinates etc. are obtained.

The esters are prepared from the afore-mentioned acids or their halides, anhydrides, thiol derivatives or ketenes. Transesterification methods are likewise suitable. To prepare the water-soluble salts the semiesters are reacted in as such known manner, for example with alkali metal hydroxides or carbonates or bicarbonates, more especially with sodium bicarbonate, or with an organic base such as ethanolamide, diethanolamine, triethanolamine, dibenzylethylenediamine, ephedrine, or with α-1-phenyl-2-methylaminopropane. It is a special advantage of these semiesters that they yield relatively stable aqueous solutions with the afore-mentioned organic and inorganic bases.

The starting materials are known.

The present invention further covers mixtures of substances intended to be used in human or veterinary medicine, containing the afore-mentioned halogenoandrostene compounds in combination with a solid or liquid pharmaceutical excipient. The mixtures of substances are prepared by methods known per se, for example with the use of pharmaceutical organic or inorganic excipient suitable for parenteral, enteral or local administration. For this purpose may be used substances that do not react with the products of the present process such, for example, as water, vegetable oils, benzyl alcohols, polyethyleneglycols, gelatine, lactose, starch, magnesium stearate, talc, white petroleum jelly, cholesterol or other pharmaceutical excipients. Preferred preparations are those intended for parenteral administration, advantageously in the form of solutions, more especially oily or aqueous solutions, furthermore suspensions, emulsions or implants; for enteral administration there are also used tablets or dragees, and for local administration also ointments or creams. If desired, the preparations may be sterilized or contain auxiliaries such as preservatives, stabilizers, wetting agents or emulsifiers, salts for varying the osmotic pressure, or buffers. The content of active substance in these preparations, such as of an ampoule, is preferably 0.1–200 mg. or 0.03–60%.

The following examples illustrate the invention:

Example 1

10.0 grams of 9α-fluoro-11β-hydroxy-17α-methyl-testosterone are dissolved in 1300 cc. of methanol and 200 cc. of ethyl acetate. The clear solution is cooled to −5° C. and 2.5 grams of sodium boron hydride are tipped in; the hydride dissolves rapidly after having been rotated several times, with a slight evolution of hydrogen. The progress of the reduction is observed by periodically checking the ultra-violet absorption. About 2 hours after the addition of sodium boron hydride, α:β-unsaturated ketone can no longer be detected in the ultraviolet spectrum, whereas a simultaneous spot test with silver nitrate still reveals the presence of some excess sodium boron hydride. The whole is kept overnight at 0° C., and the clear reaction solution is treated with 10 cc. of water and then with 50 cc. of 0.5 N-acetic acid [pH=6 to 7]. The clear solution is concentrated in vacuo at 40 to 50° C. to about 100 cc., treated with another 300 cc. of water, and the whole is once again evaporated in vacuo to 100 cc. The mixture is diluted with 500 cc. of water, and the precipitated reaction product is suctioned off, thoroughly washed with water and dried, to yield 9.4 grams of Δ⁴-9α-fluoro-3β:11β:17β - trihydroxy - 17α - methyl-androstene melting at 206 to 207° C. After having been recrystallized from acetone the reaction product melts at 215–216° C. $\lambda_{max}$ 3.05, 6.00–6.05, 6.84μ.

A similar reduction of 9α-chloro - 11β - hydroxy-17-methyltestosterone with sodium boron hydride yields Δ⁴-9α-chloro-3β:11β:17β - trihydroxy-17α-methyl-androstene.

Example 2

3.38 grams of Δ⁴-9α-fluoro-3β:11β:17β-trihydroxy-17α-methyl-androstene are dissolved in 50 cc. of pyridine, treated with 10 cc. of acetanhydride, and the whole is kept overnight at room temperature. The reaction solution is poured into ice water, and the precipitate is suctioned off, washed with a copious amount of water and dried. Recrystallization from ethyl acetate or acetone yields pure Δ⁴-9α-fluoro-3β:11β:17β-trihydroxy - 17α - methyl - androstene-3-acetate in a yield of 47%.

Analogous reaction of Δ⁴ - 9α - fluoro-3β:11β:17β-trihydroxy-17α-methyl-androstene with propionic acid anhydride in pyridine gives a 76% yield of Δ⁴-9α-fluoro-3β:11β:17β-trihydroxy - 17α - methyl - androstene-3-propionate.

Example 3

3.5 grams of Δ⁴-9α-chloro-3β:11β:17β-trihydroxy-17α-methyl-androstene, 50 cc. of pyridine and 10 cc. of acetanhydride are mixed and kept overnight at room temperature. The clear reaction solution is poured into ice, and the precipitate is suctioned off, washed and dried in vacuo at 40 to 60° C. Recrystallization from ether+petroleum ether gives a 70% yield of Δ⁴-9α-chloro-3β:11β:17β-trihydroxy-17α-methyl-androstene-3-acetate.

Example 4

3.5 grams of Δ⁴-9α-chloro-3β:11β:17β-trihydroxy-17α-methyl-androstene are dissolved in 50 cc. of pyridine, 10 cc. of propionic acid anhydride are added, and the mixture is kept for 24 hours at room temperature and then poured into ice water to precipitate the reaction product which is suctioned off, washed with water and dried. Recrystallization from acetone yields pure Δ⁴-9α-chloro-3β:11β:17β-trihydroxy - 17α - methyl - androstene-3-propionate.

Example 5

3.38 grams of Δ⁴-9α-fluoro-3β:11β:17β-trihydroxy-17α-methyl-androstene are dissolved in 50 cc. of pyridine. In the course of 30 minutes a solution of 2.0 cc. of trimethylacetyl chloride in 25 cc. of pyridine is run in at 20 to 25° C. The whole is kept overnight at room temperature and then further worked up as described in Example 4. Recrystallization from ethyl acetate yields 3.2 grams of Δ⁴-9α-fluoro-3β:11β:17β-trihydroxy-17α-methyl-androstene-3-trimethylacetate.

A similar reaction of Δ⁴ - 9α - chloro - 3β:11β:17β-trihydroxy-17α-methyl-androstene with trimethylacetyl chloride in pyridine yields Δ⁴ - 9α - chloro-3β:11β:17β-trihydroxy-17α-methyl-androstene-3-trimethylacetate.

Example 6

3.38 grams of Δ⁴-9α-fluoro-3β:11β:17β-trihydroxy-17α-methyl-androstene are heated with 2.0 grams of succinic acid anhydride in 50 cc. of pyridine for 30 minutes on a boiling water bath under nitrogen. The whole is cooled, poured into dilute ice-cold hydrochloric acid, suction-filtered, washed with dilute hydrochloric acid and then with water, dried, and recrystallized from methanol, to yield Δ⁴-9α-fluoro - 3β:11β:17β - trihydroxy-17α-methyl-androstene-3-hemisuccinate.

To prepare the water-soluble sodium salt of Δ⁴-9α-fluoro-3β:11β:17β-trihydroxy - 17α - methyl-androstene-3-hemisuccinate 0.438 gram of Δ⁴-9α-fluoro-3β:11β:17β-trihydroxy-17α-methyl-androstene-3-hemisuccinate is dissolved in 11 cc. of 0.1 N-sodium bicarbonate solution. The solution is filtered until it is clear and then lyophilized by a known method, to yield 0.5 gram of the sodium salt of Δ⁴-9α-fluoro - 3β:11β:17β - trihydroxy - 17α - methyl-androstene-3-hemisuccinate.

Similar reaction of triethanolamine with Δ⁴-9α-fluoro-3β:11β:17β - trihydroxy - 17α - methyl - androstene - 3-hemisuccinate yields the triethanolamine salt of Δ⁴-9α-fluoro - 3β:11β:17β - trihydroxy - 17α - methyl - androstene-3-hemisuccinate.

Example 7

3.38 grams of Δ⁴-9α-fluoro-3β:11β:17β-trihydroxy-17α-methyl-androstene, 2.3 grams of diglycolic acid anhydride and 50 cc. of pyridine are heated for 30 minutes at 100° C. under nitrogen. The cooled reaction solution is poured into ice water, the whole is extracted with methylene chloride and the extract is washed with dilute hydrochloric acid and water, dried over sodium sulfate and evaporated. The residue is recrystallized from methanol to yield Δ⁴-9α - fluoro - 3β:11β:17β - trihydroxy - 17α - methyl - androstene-3-hemidiglycolate.

Similar reaction of Δ⁴-9α-chloro-3β:11β:17β-trihydroxy-17α-methyl-androstene with diglycolic acid anhydride yields Δ⁴ - 9α - chloro - 3β:11β:17β - trihydroxy-17α-methyl-androstene -3-hemidiglycolate.

To prepare the water-soluble sodium salt of Δ⁴-9α-fluoro - 3β:11β:17β - trihydroxy - 17α - methyl - androstene-3-hemidiglycolate, 0.454 gram of Δ4-9α-fluoro-3β:11β:17β - trihydroxy - 17α - methyl - androstene -3-hemidiglycolate is dissolved in 11.0 cc. of 0.1 N-sodium bicarbonate solution, the solution is filtered until it is clear and then lyophilized, to yield 0.5 gram of the sodium salt of Δ⁴-9α-fluoro-3β:11β:17β-trihydroxy-17α-methyl-androstene-3-hemidiglycolate.

Example 8

3.50 grams of Δ⁴ - 9α - chloro - 3β:11β:17β-trihydroxy-17α-methyl-androstene, 2.0 grams of succinic acid anhydride and 50 cc. of pyridine are heated for 30 minutes on a boiling water bath under nitrogen. Working up as described in Example 6 yields Δ⁴-9α-chloro-3β:11β:17β-trihydroxy-17α-methyl-androstene-3-hemisuccinate.

To prepare the water-soluble sodium salt of Δ⁴-9α-chloro - 3β:11β:17β - trihydroxy - 17α - methyl - androstene-3-hemisuccinate, 0.455 gram of Δ⁴-9α-chloro-3β:11β:17β - trihydroxy - 17α - methyl - androstene - 3-hemisuccinate is dissolved in 11.0 cc. of O.1 N-sodium bicarbonate solution and then lyophilized, to yield 0.5 gram of the sodium salt of Δ⁴-9α-chloro-3β:11β:17β-trihydroxy17α-methyl-androstene-3-hemisuccinate.

Example 9

0.338 gram of Δ⁴ - fluoro - 3β:11β:17β - trihydroxy-17α-methyl-androstene, 2.7 grams of tetrahydrophthalic acid anhydride and 100 cc. of pyridine are heated for 30 minutes at 100° C. under nitrogen. Working up as described in Example 6 yields $\Delta^4$-9α-fluoro-3β:11β:17β-trihydroxy - 17α - methyl - androstene - 3 - hemi - tetrahydrophthalate.

To prepare the water-soluble sodium salt of $\Delta^4$-9α-fluoro - 3β:11β:17β - trihydroxy - 17α - methyl - androstene-3-hemi-tetrahydrophthalate 0.487 gram of $\Delta^4$-9α-fluoro - 3β:11β:-17β - trihydroxy - 17α - methyl - androstene - 3 hemi - tetrahydrophthalate is dissolved in 11.0 cc. of 0.1 N-sodium bicarbonate solution and lyophilized, to yield 0.5 gram of the sodium salt of $\Delta^4$-9α-fluoro-3β:11β:-17β - trihydroxy - 17α - methyl - androstene-3-hemi-tetrahydrophthalate.

Similar reaction of diethanolamine with $\Delta^4$-9α-fluoro-3β:11β:17β - trihydroxy - 17α - methyl - androstene - 3-hemi-tetrahydrophthalate yields the diethanolamine salt of $\Delta^4$ - 9α - fluoro - 3β:11β:17β - trihydroxy 17α - methyl-androstene-3-hemi-tetrahydrophthalate.

*Example 10*

0.35 gram of $\Delta^4$ - 9α - chloro - 3β:11β:17β - trihydroxy-17α-methyl-androstene, 2.7 grams of tetrahydrophthalic acid anhydride and 100 cc. of pyridine are heated for 30 minutes at 100° C. under nitrogen. Working up as described in Example 6 yields $\Delta^4$ - 9α - chloro - 3β:11β:17β-trihydroxy - 17α - methyl - androstene - 3 - hemi - tetrahydrophthalate.

To prepare the water-soluble sodium salt of $\Delta^4$-9α-chloro - 3β:11β:17β - trihydroxy - 17α - methyl - androstene - 3 - hemi - tetrahydrophthalate 0.507 gram of $\Delta^4$ - 9α - chloro - 3β:11β:17β - trihydroxy 17α - methyl-androstene - 3 - hemi - tetrahydrophthalate is dissolved in 11.0 cc. of 0.1 N-sodium bicarbonate solution and lyophilized, to yield 0.52 gram of sodium salt of $\Delta^4$-9α - chloro - 3β:11β:17β - trihydroxy - 17α - methyl -androstene-3-hemi-tetrahydrophthalate.

*Example 11*

0.338 gram of $\Delta^4$-9α-fluoro-3β:11β:17β-trihydroxy-17α-methyl-androstene is dissolved in 50 cc. of pyridine and in the course of 30 minutes a solution of 2.0 grams of benzoyl chloride in 25 cc. of pyridine is run in at 20 to 25° C. The mixture is kept overnight at room temperature and then worked up as described in Example 4. Recrystallization from ethyl acetate yields $\Delta^4$-9α-fluoro-3β:11β:17β - trihydroxy - 17α - methyl - androstene - 3-benzoate.

Similar reaction of $\Delta^4$-9α-chloro-3β:11β:17β-trihydroxy-17α-methyl-androstene with benzoyl chloride in pyridine yields $\Delta^4$ - 9α - chloro - 3β:11β:17β - trihydroxy- 17α-methyl-androstene-3-benzoate.

*Example 12*

0.338 gram of $\Delta^4$ - 9α - fluoro - 3β:11β:17β - trihydroxy-17α-methyl-androstene is dissolved in 20 cc. of pyridine and, after adding 0.3 gram of cyclopropanecarboxylic acid anhydride under nitrogen, heated for 30 minutes on a boiling water bath. After allowing the whole to stand overnight at room temperature the reaction solution is concentrated under reduced pressure by means of a film still, the residue is taken up in chloroform and the solution washed in succession with dilute hydrochloric acid, water, dilute sodium carbonate and again with water, dried over sodium sulfate, filtered and evaporated. On recrystallization from ethanol, the residue yields $\Delta^4$ - 9α - fluoro - 3β:11β:17β - trihydroxy - 17α-methyl-androstene-3-cyclopropaneformate.

Similar reaction of $\Delta^4$ - 9α - chloro - 3β:11β:17β - trihydroxy-17α-methyl-androstene with cyclopropane-carboxylic acid anhydride in pyridine yields $\Delta^4$-9α-chloro-3β:11β:17β - trihydroxy - 17α - methyl - androstene - 3-cyclopropaneformate.

*Example 13*

0.8 gram of liquid sulfur trioxide is added dropwise under nitrogen to 30 cc. of dry pyridine at −10 to −5° C. In the course of 30 minutes a solution of 3.4 grams of $\Delta^4$ - 9α - fluoro - 3β:11β:17β - trihydroxy - 17α - methyl-androstene in 30 cc. of dry pyridine is run in to the pyridine-sulfur trioxide adduct in pyridine with continuous cooling. The reaction mixture is first stirred for 1–2 hours at 0° C., the pyridine-sulfur trioxide adduct gradually dissolving, and is then maintained for 2–3 hours at room temperature. The pyridine is then extensively distilled under reduced pressure by means of a centrifugal film still. Until crystallization sets in the residue is repeatedly digested with dry ether, the crystalline magma covered with dry ether and allowed to stand overnight. The reaction mixture is suction-filtered, the crystallisate dissolved in 90 cc. of methanol and the solution titrated with 1.0 N-sodium methylate to pH=9. The sodium sulfate precipitating during titration is separated and the filtrate concentrated at 40° C. under reduced pressure by means of a centrifugal film still, the concentrated solution cooled to −40 to −50° C. and introduced slowly and with stirring into ether. The resulting crystalline suspension is filtered with suction after cooling overnight, washed with some ether and dried. There are obtained 3–4 grams of the water-soluble sodium salt of $\Delta^4$-9α-fluoro - 3β:11β:17β - trihydroxy - 17α - methyl - androstene-3-hemisulfate.

0.5 gram of the sodium salt of $\Delta^4$-9α-fluoro-3β:11β:17β-trihydroxy-17α-methyl-androstene-3-hemisulfate is dissolved in 50 cc. of methanol and allowed to flow slowly through a column of Amerlite IR–120 prepared with dilute hydrochloric acid and methanol. The column is rinsed with methanol until the filtrate is practically no longer absorbed in the ultraviolet spectrum at 240 mμ. The filtrate is concentrated at a temperature of 40° C. at the most by the film still method, diluted with ether, $\Delta^4$-9α-fluoro-3β:11β:17β-trihydroxy-17α - methyl - androstene-3-hemisulfate precipitating. After allowing the crystallisate to stand overnight in a refrigerator, it is suction-filtered and dried. There is obtained 0.4 gram of $\Delta^4$-9α-fluoro-3β:11β:17β-trihydroxy-17α - methyl - androstene-3-hemisulfate which dissolves to give a clear solution in dilute sodium bicarbonate solution.

Analogous reaction of $\Delta^4$-9α-chloro-3β:11β:17β-trihydroxy-17α-methyl-androstene with pyridine sulfur trioxide adduct yields $\Delta^4$-9α-chloro-3β:11β:17β-trihydroxy-17α-methyl-androstene-3-hemisulfate and from that the water-soluble sodium salt of $\Delta^4$-9α-chloro-3β:11β:17β-trihydroxy-17α-methylandrostene-3-hemisulfate.

*Example 14*

0.4 gram of $\Delta^4$-9α-fluoro-3β:11β:17β-trihydroxy-17α-methyl-androstene-3-hemisuccinate is dissolved in 20 cc. of methanol, and a solution of diazomethane in ether is added with cooling by means of ice water until the yellow colour persists. Glacial acetic acid is added dropwise until the mixture is decolourized which is then concentrated under reduced pressure until crystallization sets in. After being allowed to stand overnight in a refrigerator, the crystallisate is suction-filtered. There is obtained 0.2 gram of the methyl ester of $\Delta^4$-9α-fluoro-3β:11β:17β-trihydroxy-17α-methyl-androstene-3-hemisuccinate. From the mother liquor there is obtained a further quantity of the methyl ester after concentration.

Analogous reaction of diazomethane with $\Delta^4$-9α-fluoro-3β:11β:17β-trihydroxy-17α-methyl-androstene-3 - hemidiglycolate yields the methyl ester of $\Delta^4$-9α-fluoro-3β:11β:17β-trihydroxy-17α-methyl-androstene -3- hemidiglycolate, of diazomethane with $\Delta^4$-9α-fluoro-3β:11β:17β-trihydroxy-17α - methyl - androstene - 3 - hemitetrahydrophthalate the methyl ester of $\Delta^4$-9α-fluoro-3β:11β:17β-trihydroxy-17α-methyl-androstene - 3 - hemi - tetrahydrophthalate and of diazomethane with $\Delta^4$-9α-fluoro-3β:11β:17β-trihydroxy-17α-methyl-androstene-3-hemisulfate the methyl ester of Δ⁴-9α-fluoro-3β:11β:17β-trihydroxy-17α-methyl-androstene-3-hemisulfate.

Using the same procedure there is obtained from Δ⁴-9α-chloro-3β:11β:17β-trihydroxy-17α-methyl-androstene-3-hemidiglycolate, -succinate, -tetrahydrophthalate and -sulfate by reaction with diazomethane in methanol-ether the methyl ester of Δ⁴-9α-chloro-3β:11β:17β-trihydroxy-17α-methyl - androstene - 3 - hemidiglycolate, -succinate, -tetrahydrophthalate and -sulfate.

What is claimed is:

1. The Δ⁴-9α-fluoro-3β:11β:17β-trihydroxy-17α-methyl-androstene.

2. The Δ⁴-9α-chloro-3β:11β:17β-trihydroxy-17α-methyl-androstene.

3. A member selected from the group consisting of the 3-hemisuccinate of Δ⁴-9α-fluoro-3β:11β:17β-trihydroxy-17α-methyl-androstene and its sodium and triethanolamine salts.

4. A member selected from the group consisting of the 3-hemidiglycolate of Δ⁴-9α-fluoro-3β:11β17β-trihydroxy-17α-methyl-androstene and its sodium salt.

5. A member selected from the group consisting of the 3-hemidiglycolate of Δ⁴-9α-chloro-3β:11β:17β-trihydroxy-17α-methyl-androstene and its sodium salt.

6. A member selected from the group consisting of the 3-hemisuccinate of Δ⁴-9α-chloro-3β:11β:17β-trihydroxy-17α-methyl-androstene and its sodium salt.

7. A member selected from the group consisting of the 3-hemi-tetrahydrophthalate of Δ⁴-9α-fluoro-3β:11β:17β-trihydroxy-17α-methyl androstene and its sodium and diethanolamine salt.

8. A member selected from the group consisting of the 3-hemi-tetrahydrophthalate of Δ⁴-9α-chloro-3β:11β:17β-trihydroxy-17α-methyl-androstene and its sodium salt.

9. A compound selected from the group consisting of Δ⁴-9α-fluoro-3β:11β:17β-trihydroxy-17α - methyl - androstene, Δ⁴-9α-chloro-3β:11β:17β-trihydroxy - 17α - methyl-androstene and their 3-esters.

10. A pharmaceutical composition comprising a compound of claim 9, containing the active ingredient in an amount ranging from 0.03–60% together with a suitable pharmaceutical carrier.

11. A pharmaceutical composition as claimed in claim 10, containing the active ingredient in an amount ranging from 0.03–60% together with a suitable pharmaceutical carrier in form of tablets.

12. A pharmaceutical composition as claimed in claim 10, containing the active ingredient in an amount ranging from 0.03–60% together with a suitable pharmaceutical carrier in form of oil ampoules.

13. A pharmaceutical composition as claimed in claim 10, containing the active ingredient in an amount ranging from 0.03–60% together with a suitable pharmaceutical carrier in form of ampoules containing aqueous solutions.

References Cited in the file of this patent

UNITED STATES PATENTS 2,837,517    Herr ----------------- June 3, 1958

UNITED STATES PATENT OFFICE
CERTIFICATION OF CORRECTION

Patent No. 3,012,941                                         December 12, 1961

Albert Wettstein et al.

It is hereby certified that error appears in the above numbered patent requiring correction and that the said Letters Patent should read as corrected below.

Column 1, line 22, for "atom," read -- atom - --; same column, line 35, for "atom, is" read -- atom - is --; column 3, line 41, for "47%." read -- 74%. --; column 4, line 49, for "$\Delta$4-9$\alpha$-fluoro-" read -- $\Delta^4$-9$\alpha$-fluoro- --; lines 70 and 71, for "-trihydroxy17$\alpha$-" read -- -trihydroxy-17$\alpha$- --; same column, line 74, for "$\Delta^4$-fluoro-" read -- $\Delta^4$-9$\alpha$-fluoro- --; column 5, line 10, for "-3 hemi-" read -- -3-hemi- --; same column, lines 18 and 32, for "trihydroxy 17$\alpha$-", each occurrence, read -- trihydroxy-17$\alpha$- --; column 6, line 48, for "-methylandrostene-" read -- -methyl-androstene- --; column 7, line 20, for "11$\beta$17$\beta$-" read -- 11$\beta$:17$\beta$- --.

Signed and sealed this 11th day of September 1962.

(SEAL)
Attest:

ERNEST W. SWIDER
Attesting Officer

DAVID L. LADD
Commissioner of Patents